(12) United States Patent
Susnow et al.

(10) Patent No.: US 7,054,331 B1
(45) Date of Patent: May 30, 2006

(54) MULTI-LANE RECEIVER DE-SKEWING

(75) Inventors: Dean S. Susnow, Portland, OR (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 09/660,909

(22) Filed: Sep. 13, 2000

(51) Int. Cl.
| | |
|---|---|
| H04J 3/06 | (2006.01) |
| H04L 25/38 | (2006.01) |
| H04L 25/00 | (2006.01) |
| H04L 25/40 | (2006.01) |

(52) U.S. Cl. ............... 370/465; 370/503; 370/508; 370/517; 375/369; 375/371

(58) Field of Classification Search ........... 370/389, 370/465, 503, 505, 506, 508, 517, 518; 375/356, 375/371, 372, 369; 710/52, 58, 60, 61, 118
See application file for complete search history.

(56) References Cited

U.S. PATENT DOCUMENTS

| | | | | |
|---|---|---|---|---|
| 5,313,501 A | * | 5/1994 | Thacker | 375/369 |
| 5,719,862 A | * | 2/1998 | Lee et al. | 370/355 |
| 5,774,697 A | * | 6/1998 | Hall | 395/500 |
| 6,031,847 A | * | 2/2000 | Collins et al. | 370/508 |
| 6,044,121 A | * | 3/2000 | Nolan et al. | 375/354 |
| 6,536,025 B1 | * | 3/2003 | Kennedy et al. | 716/6 |
| 6,553,505 B1 | * | 4/2003 | Brown et al. | 713/401 |
| 6,625,675 B1 | * | 9/2003 | Mann | 710/61 |
| 6,654,824 B1 | * | 11/2003 | Vila et al. | 710/60 |
| 6,658,363 B1 | * | 12/2003 | Mejia et al. | 702/125 |

OTHER PUBLICATIONS

Alderrou, Don, et al., "XAUi/XGXS Proposal", *IEEE 802.3ae Task Force Presentation on May 23–25, 2000 in Ottawa, Ontario, Canada*, 26 slides and 2 additional figures.
Dedrick, Joel H., "New Sources of Lane to Lane Skew, and A Proposal for Alignment", *Presentation, Aanetcom on Jan. 18, 2000*, 1–9.

* cited by examiner

*Primary Examiner*—Man Phan
(74) *Attorney, Agent, or Firm*—Glen B. Choi

(57) ABSTRACT

A technique for de-skewing a group of serial data signals respectively outputted from a group of data lanes includes simultaneously feeding a test signal to inputs of the group of data lanes and monitoring respective outputs thereof. A predetermined data element of the test signal outputted from each of the group of data lanes is respectively detected and respective elapsed times from the detection of the predetermined data element outputted from each of the group of data lanes to the detection that the predetermined data element has been outputted from all of the group of data lanes are measured. The group of serial data signals are then de-skewed by respectively delaying them in accordance with their respective measured elapsed times. The test signal may include the predetermined data element, a lane identifier, and a predetermined number of additional data symbols, the predetermined data element being a predetermined data character. The elapsed times may be measured by a group of lane tolerance counters, each counter initiating counting upon the detection of the predetermined data element in its data lane and each counter stopping counting upon the detection that the predetermined data element has been outputted from all of the group of data lanes. The group of serial data signals may be respectively delayed by a group of registers and the amount of delay of each data signal may be selected by a respective multiplexer connected to the group of registers, each multiplexer being controlled by its' respective counter.

22 Claims, 7 Drawing Sheets

US 7,054,331 B1

MULTI-LANE RECEIVER DE-SKEWING

BACKGROUND OF THE INVENTION

1. Field of the Invention

The present invention relates to lane de-skewing and more particularly, the present invention relates to de-skewing in a multi-lane receiver.

2. Description of the Related Art

Communication networks often utilize a SERDES (serializer/de-serializer) as a means of converting slow speed parallel signals into higher speed serial signals. When there is a large number of parallel signals, they are often converted into more than one serial signal. This is often referred to as a multi-lane link.

In a multi-lane link, the time it takes for a signal to travel from the transmitting end to the receiving end varies from lane to lane. This is referred to as lane skew. There are many sources causing the lane to lane skew including, but not limited to, chip I/O drivers and receivers, printed wiring boards, electrical and optical cables, serialization and de-serialization logic, and re-timing repeaters.

In order to properly reconstitute a group of parallel signals which have been transformed into more than one serial signal traveling on more than one lane, it is necessary to eliminate the effect of the lane skew. This is referred to as de-skewing.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it is to be understood that the same is by way of illustration and example only and the invention is not limited thereto. This spirit and scope of the present invention are limited only by the terms of the appended claims.

The following represents brief descriptions of the drawings, wherein.

DETAILED DESCRIPTION

Figure 1:
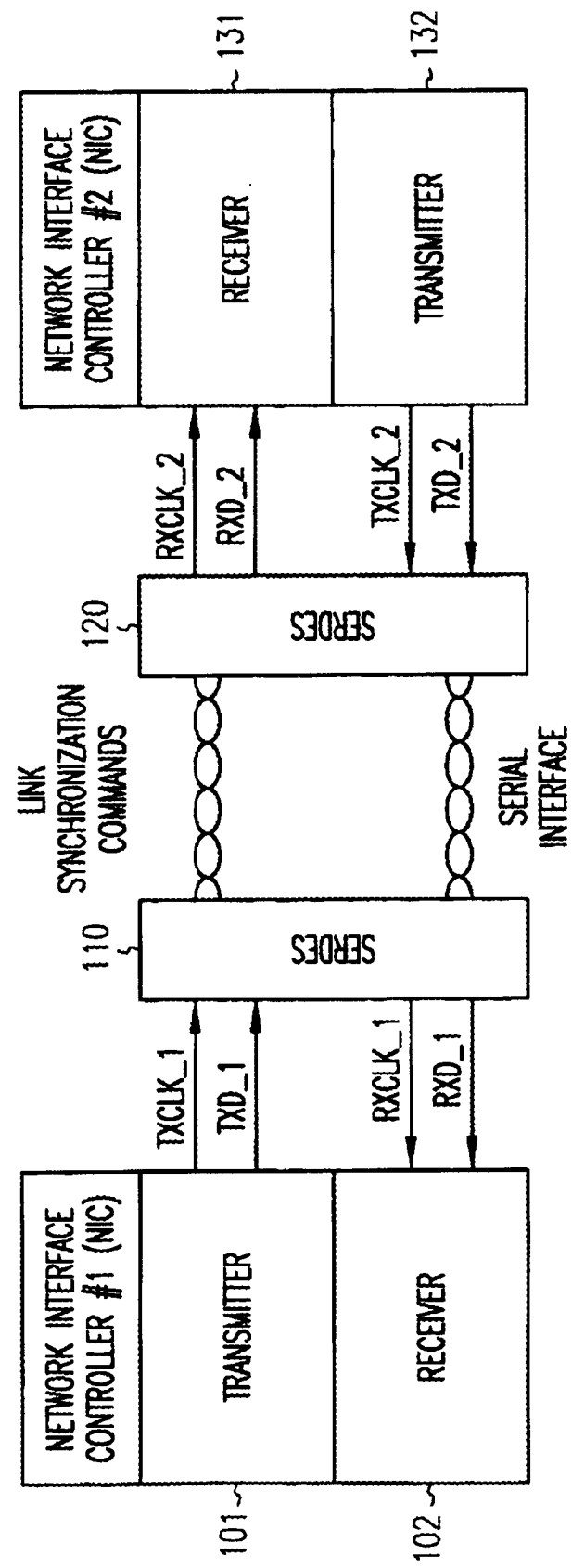
FIG. 1 is a block diagram of a single lane link.

Before beginning a detailed description of the subject invention, the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, with regard to the description of any timing signals, the terms assertion and negation may be used in an intended generic sense. More particularly, such terms are used to avoid confusion when working with a mixture of "active-low" and "active-high" signals, and to represent the fact that the invention is not limited to the illustrated/ described signals, but could be implemented with a total/ partial reversal of any of the "active-low" and "active-high" signals by a simple change in logic. More specifically, the terms "assert" or "assertion" indicate that a signal is active independent of whether that level is represented by a high or low voltage, while the terms "negate" or "negation" indicate that a signal is inactive. As a final note, well-known elements and connections within the drawing figures may not be shown for simplicity of illustration and discussion and so as not to obscure the invention.

FIG. 1 is a block diagram of a single lane link. The SERDES 110 receives a parallel data stream TXD1 and an associated transmit clock TXCLK1 from the transmitter 101. The SERDES 110 then serializes the data and transmits it across the serial interface to the SERDES 120. The SERDES 110 also receives a serial data stream from the SERDES 120 and reconstitutes a parallel receive data stream RXD1 and an associated receive clock RXCLK1 and provides them to the receiver 102. In a similar fashion, the SERDES 120 receives a serial data stream from the SERDES 110 and reconstitutes a parallel receive data stream RXD2 and an associated receive clock RXCLK2 and provides them to the receiver 131. The SERDES 120 also receives a parallel data stream TXD2 and an associated transmit clock TXCLK2 from the transmitter 132 and then serializes the data and transmits it across the serial interface to the SERDES 110. The transmitter 101 and receiver 102 are controlled by a Network Interface Controller (NIC) #1 while the transmitter 132 and receiver 131 are controlled by NIC #2.

The single lane link of FIG. 1 has a network bandwidth which is limited by the frequency of the respective transmit clocks of the two ports. In order to improve the network bandwidth without requiring an increase in the clock frequency, a multi-lane transmitter and receiver arrangement may be used. The transmitters and receivers of the respective ports of the multi-lane arrangement interface with multiple SERDES utilizing multiple serial data streams arranged in parallel so as to increase the bandwidth. The transmit data stream may be byte striped across the serial lanes in the transmitter and reassembled in the corresponding receiver. This enables existing technology to achieve a quantum performance improvement simply by scaling the number of serial links utilized.

Figure 2:
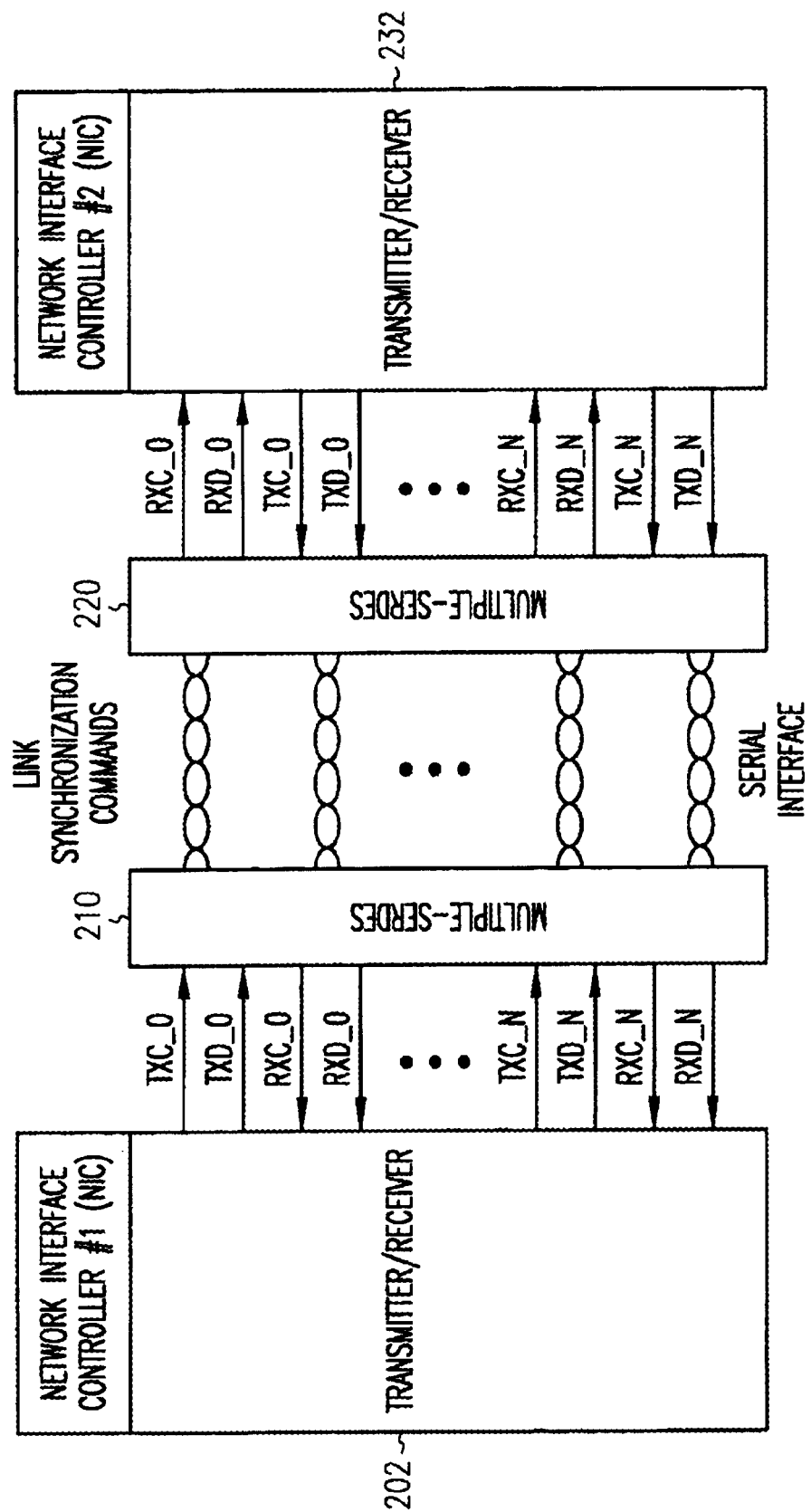
FIG. 2 is a block diagram of a multi-lane link.

FIG. 2 is a block diagram of such a multi-lane link. A transmitter/receiver block 202, which consists of a transmitter and a receiver, connected to a plurality of SERDES 210. These SERDES 210 are in turn connected to another plurality of SERDES 220 by N serial lanes. The plurality of SERDES 220 is connected to transmitter/receiver block 232, which consists of a transmitter and a receiver. The transmitter/receiver block 202 is controlled by NIC #1 while the transmitter/receiver block 232 is controlled by NIC #2. The operation of the transmitters and receivers and the plurality of SERDES essentially correspond to the corresponding elements of FIG. 1 Unfortunately, as noted in the Description of the Related Art above, the time it takes a signal to traverse the distance between the transmitter/ receiver 202 and the transmitter/receiver 232 varies from path to path.

Figure 3:
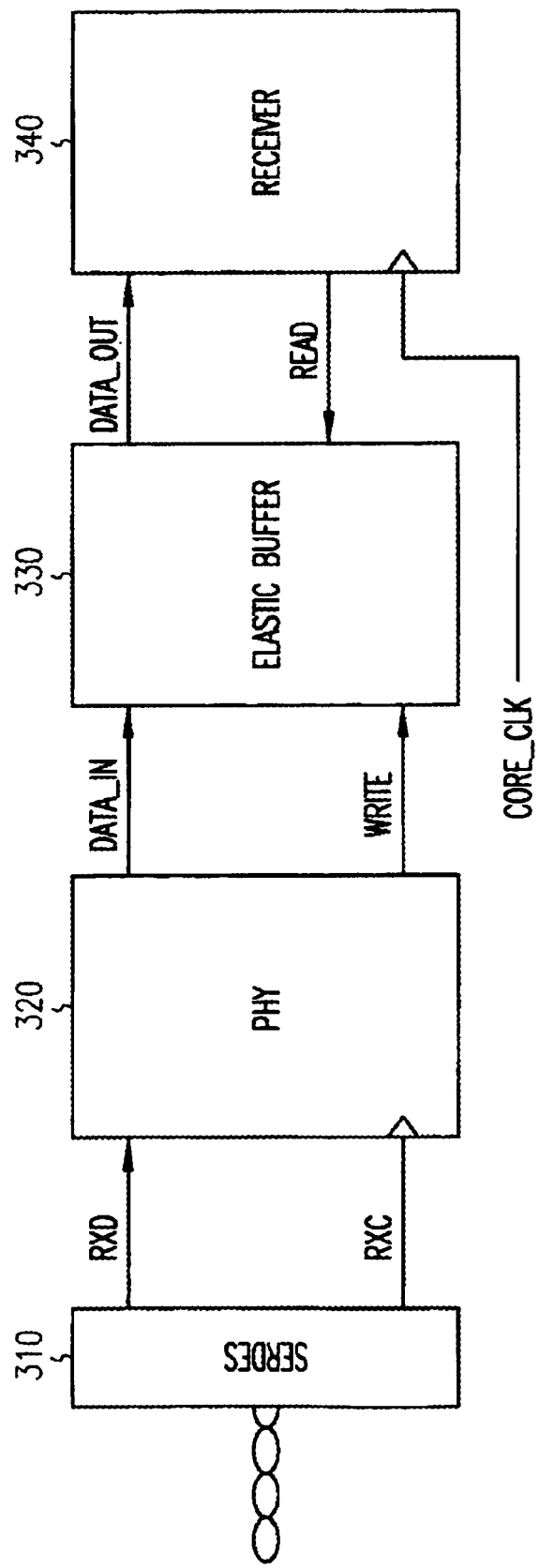
FIG. 3 is a block diagram of a single lane receive architecture.

One challenge in implementing a network utilizing serial link architecture is to ensure that high-speed data communication between a data transmitter (source node) and a data receiver (destination node) operating in two different clock domains are synchronous with respect to the transmission and reception of data within each data packet. Such a data transmitter and data receiver may correspond to different nodes of a network which operate in synchronism with different clock signals. The failure to maintain synchronization between the data transmitter and the data receiver may result in a loss of data. Accordingly, a data receiver connected to such a network must transition the data stream from the network clock domain RXC into its own core clock domain. An elastic buffer may be used to transition the receive data stream from the SERDES into the core clock domain. FIG. 3 is a block diagram of the receive architecture of such an arrangement.

As shown in FIG. 3, the SERDES 310 generates the clock (RXC) and data (RXD) inputs to the PHY (Physical Interface) block 320. All of the elements in the PHY 320 operate in the RXC domain. Due to the potential instability of the RXC domain, caused by the clock being recovered from the serial data stream inputted to the SERDES, it is desirable to transition the receive data into the core clock domain. The PHY 320 controls the write function into the elastic buffer 330 which is employed to transition the data stream to the core clock domain from the RXC domain. This is required because of the frequency deviance of the oscillators used for the core clocks that generate the transmit clock and data. The receiver 340, operating in the core clock domain, extracts the data from the elastic buffer and performs all of the necessary checks prior to storing the packet in a memory. The elastic buffer serves as a mechanism for transitioning the link data stream into the core clock domain.

Figure 4:
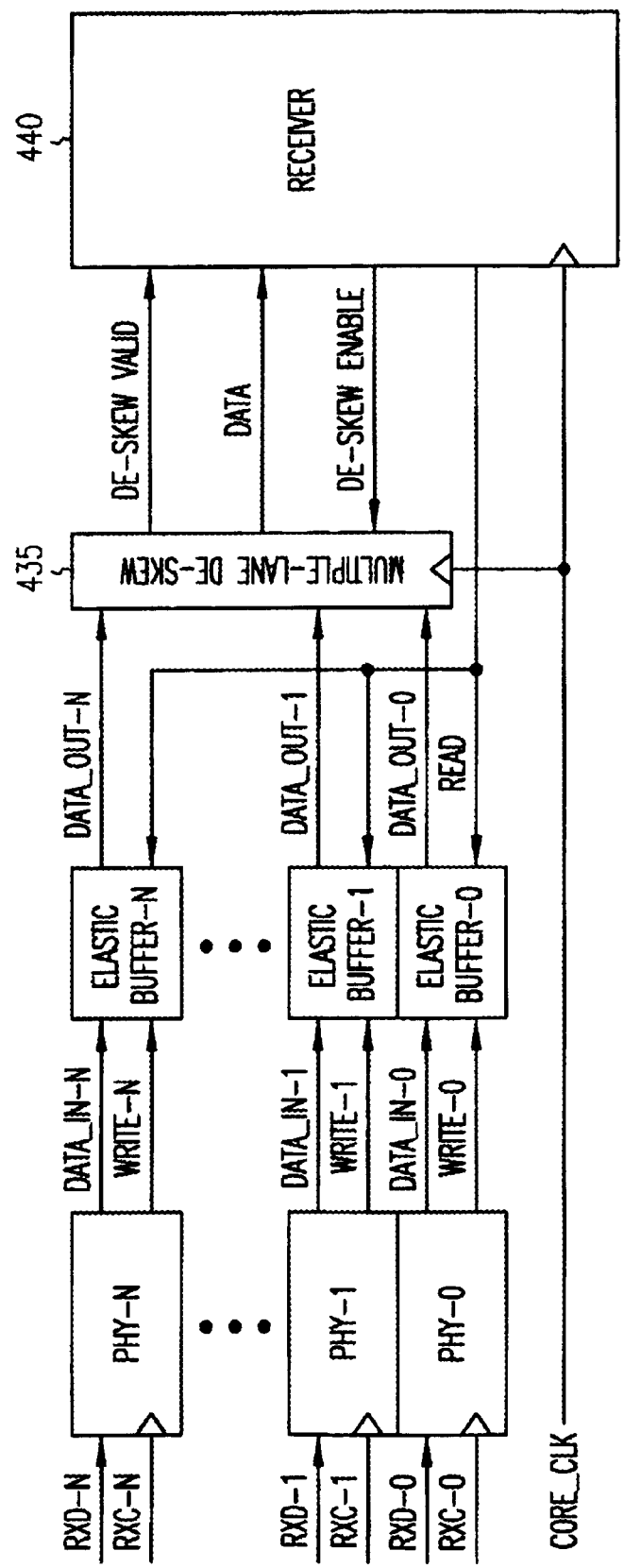
FIG. 4 is a block diagram of a multi-lane receive architecture.

As noted above, in order to increase network performance, multi-lane serial links are used. These lanes are essentially individual serial links which are operating in parallel and in synchronism. Packets are byte striped across the serial links and subsequently reassembled. FIG. 4 is a block diagram of such a multi-lane receive architecture.

As shown in FIG. 4, N+1 physical interface blocks PHY-0 to PHY-N are respectively connected to elastic buffers 0 to N. Operating the multiple links in parallel adds a level of difficulty due to the previously discussed synchronism problem. Each SERDES associated with a single lane recovers its own clock from the transmitted serial data stream inputted thereto. This may cause the respective lanes to be misaligned with respect to each other, thereby causing problems when reassembling the data. To solve this problem, a multi-lane de-skewing unit 435 is disposed between the elastic buffers and the receiver 440. The de-skewing unit 435 de-skews, that is—aligns, the data stream prior to the data stream being examined by the receiver 440. The de-skewing unit 435 receives the core clock and also receives the data output from all of the elastic buffers. It also receives a de-skew enable signal from the receiver 440, this signal initiates the de-skewing process. The de-skewing unit 435 assembles the multi-lane data into one contiguous parallel data bus inputted to the receiver 440 and also provides a de-skew valid status signal to the receiver 440 so as to inform the receiver 440 that the data has been de-skewed, that is, the data is properly aligned.

In order to "train" the de-skewing unit 435, it is necessary to provide a link training sequence to the SERDES. This link training sequence is an ordered predetermined set of data used to calibrate the de-skewing unit 435 so that subsequent data input will be properly aligned. A typical link training sequence may, for example, include a sixteen symbol ordered-set comprised of a comma character, a lane identifier, and fourteen data symbols which are unique to this training sequence. Furthermore, it is necessary to determine the maximum amount of skew which will be corrected between all of the lanes in the multi-lane link. This skew defines the maximum allowable difference or tolerance, specified in clock cycles, between the corresponding lanes from the transmitter to the receiver. For example, if each lane was transmitting the link training sequence, the tolerance would define the maximum number of clocks from the reception of the first comma character in any lane until all of the associated comma characters have been received on all of the lanes. Note that the use of a comma character in training the de-skewing unit 435 is merely for exemplary purposes in the following description and any character or symbol may in fact be used for training purposes.

Figure 5:
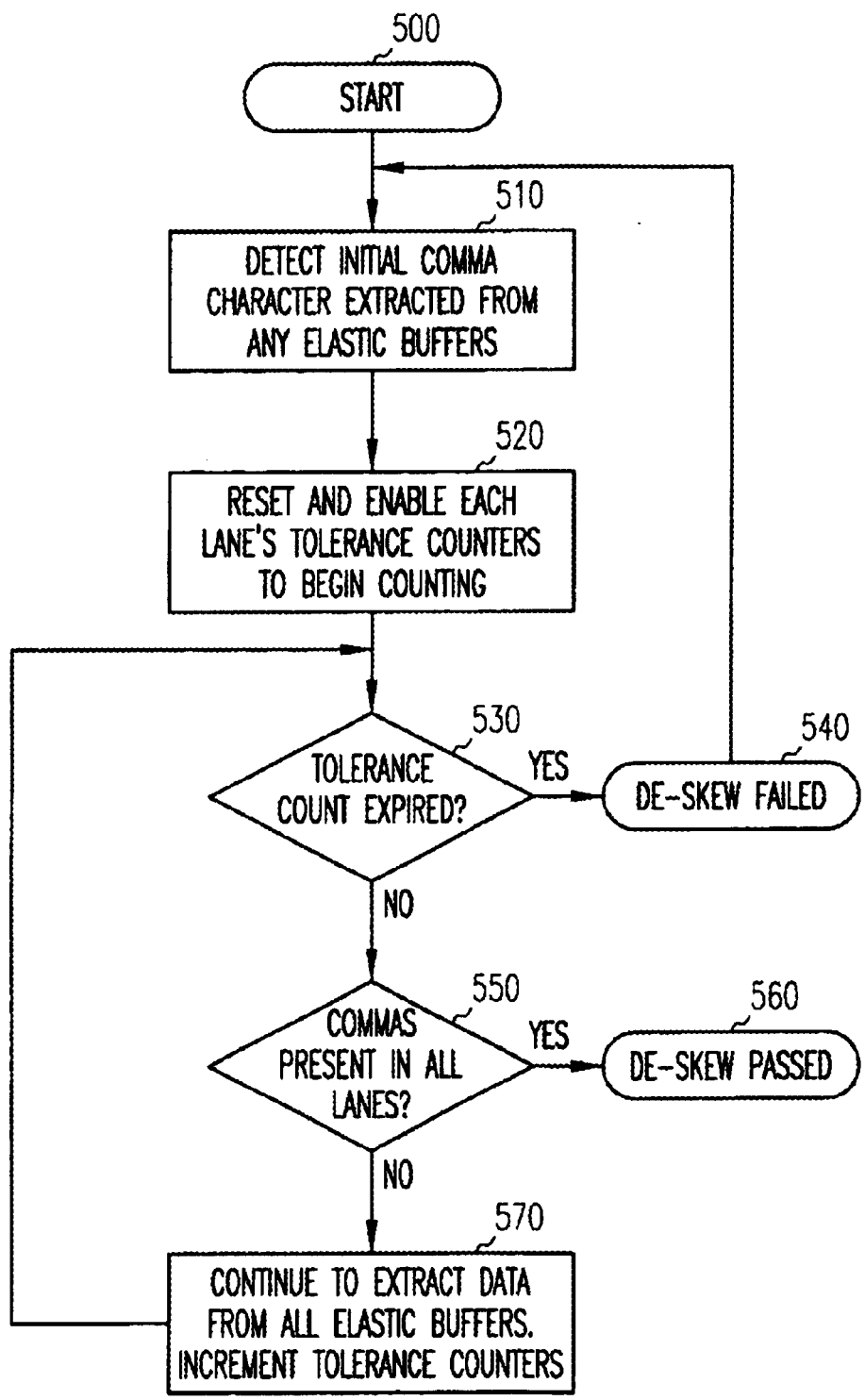
FIG. 5 is a flowchart illustrating multi-lane link de-skewing in accordance with the present invention.
Figure 6:
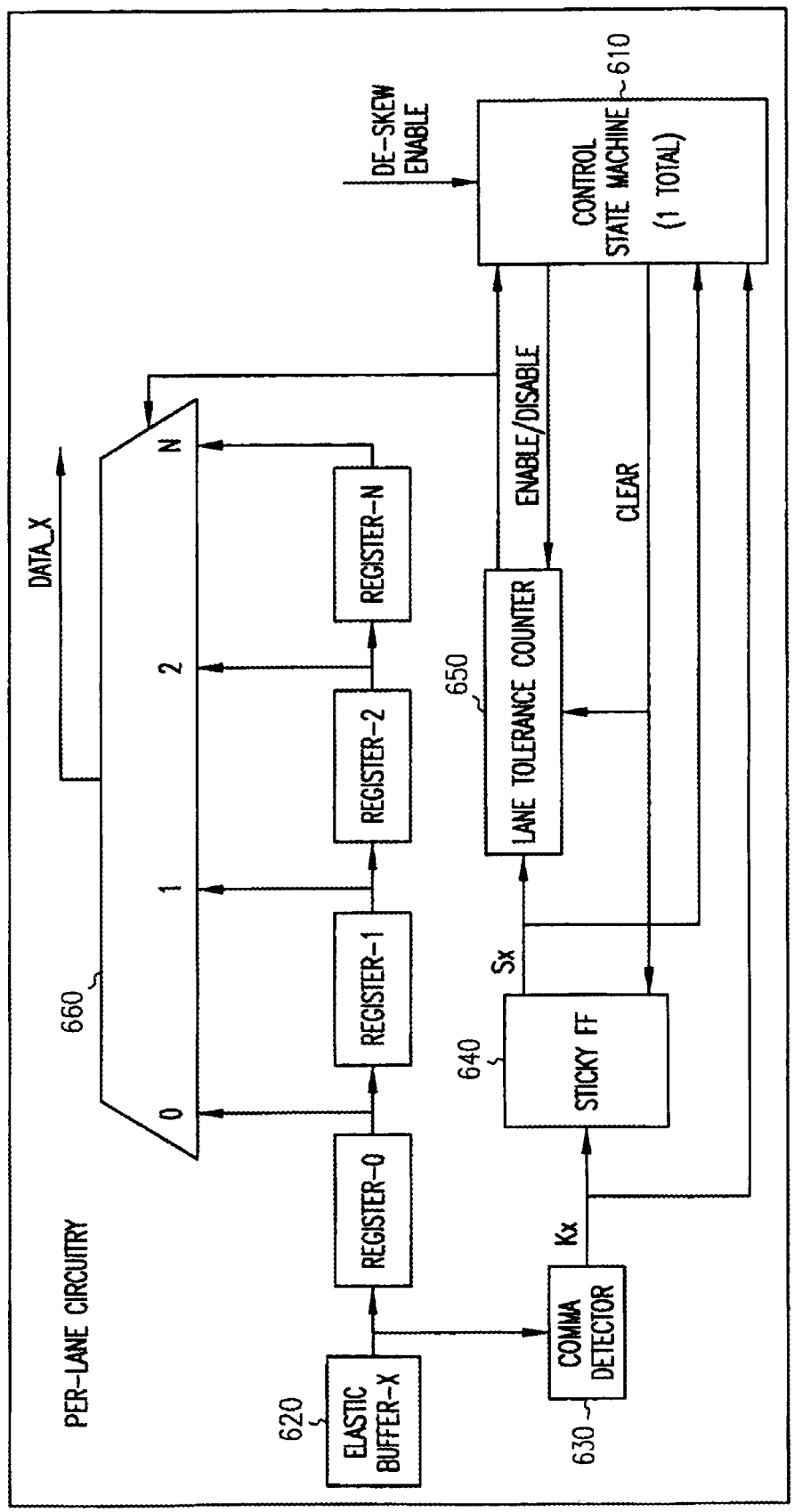
FIG. 6 is a block diagram of a multi-lane de-skewing arrangement in accordance with the present invention.

FIG. 5 is a flowchart illustrating multi-lane link de-skewing in accordance with the present invention and FIG. 6 is a block diagram of a multi-lane de-skewing arrangement in accordance with the present invention.

Multi-lane de-skewing entails interrogating the receive data stream in all lanes of the link and determining the respective skew between the corresponding lanes. Once the relative skew is determined, the data is aligned, thereby reducing the complexity of the re-assembly function of the receiver.

As shown in FIG. 6, each lane includes an elastic buffer 620, a comma detector 630, a sticky flip-flop 640, registers 0–N, a lane tolerance counter 650, and a multiplexer 660. A single control state machine 610 is connected to all of the lanes in parallel.

As shown in FIG. 5, the de-skewing begins in the start state 500 and remains there until a de-skew enable signal is received. Once enabled, the data output of each elastic buffer is examined until such time that an initial comma character is detected on one of the data lanes as shown in box 510. Upon the initial comma character being detected, the tolerance counter 650 for that lane is enabled so as to define the period in which all lanes must receive their respective comma character as shown in box 520. The circuit continues extracting information from each elastic buffer until one of the two following conditions is met, namely, if any of the lane tolerance counters expire, that is, reach a predetermined maximum count, before a comma character has been detected on all of the lanes, then the lanes are out of tolerance, that is, the skew is beyond a maximum predetermined range, as shown in box 530, thereby resulting in a de-skew failure as shown in box 540 and the de-skewing procedure returns to box 510 and re-initializes and again attempts de-skewing. On the other hand, if the comma character has been detected in all of the lanes prior to the expiration of the initial lane's tolerance counter as shown in box 550, then the de-skew is deemed successful as shown in block 560 and the current value of each lanes respective tolerance counter dictates the amount of skew present in that lane with respect the initial lane. Once determined, each lane's tolerance count value can be used to steer that lane's data accordingly to de-skew the link. Note that if the tolerance count has not yet expired as shown in box 530, and comma characters have not yet been detected in all of the lanes, then the process continues and the tolerance counters are incremented as shown in block 570.

In greater detail, again referring to FIG. 6, the serial data being outputted from the elastic buffer 620 is inputted to both the comma detector 630 and the register chain consisting of register-0, register-1, register-2, . . . , register-N. The outputs of the registers are fed to the multiplexer 660 whose output Data x is the skew corrected data output of the lane. The multiplexer selects the appropriate output based on the value of the lane tolerance counter. The output of register-0 is the output of the elastic buffer after having been delayed by one clock period. Similarly, the output of register-1 is the output of the elastic buffer after having been delayed by two clock periods and the output of register-N is the output of the elastic buffer after having been delayed by (N+1) clock periods.

The comma detector 630, upon detecting a comma character at the output of the elastic buffer 620, asserts an output Kx to the sticky flip-flop 640, thereby setting the sticky flip-flop 640. The sticky flip-flop 640, once set by the output of the comma detector 630, remains set until receiving the clear signal from the control state machine 610. The output Sx of the sticky flip-flop 640 enables the lane tolerance counter 650 to begin counting upon the enable/disable signal from the control state machine 610 being in the enable state. The output of the sticky flip-flop 640 is also outputted to the control state machine 610.

The lane tolerance counter 650 of the first lane to detect a received comma character is used to determine if the lanes are within tolerance to allow de-skewing. That is, the maximum time delay afforded by the register-0 to register-N chain determines the maximum amount of de-skewing that may be performed by the de-skewing arrangement. If the register chain allows for a delay of five clock periods, then the de-skewing arrangement can correct a maximum skew equal to five clock periods. Thus, if all of the lanes have not detected a received comma character within five clock periods from the first detection of a received comma character as measured by the lane tolerance counter 650 of the lane first detecting a received comma character, then the de-skew is considered to have failed and the de-skewing arrangement initializes the counters and then awaits the next detected received comma character to begin counting anew.

The control state machine 610, which receives the outputs from the sticky flip-flops 640 of all of the lanes, places the enable/disable output line to the lane tolerance counters 650 in the disable state upon detecting that all the sticky flip-flops 640 have been set, thereby indicating that all of the lanes have detected a received comma character. The values then locked in the lane tolerance counters are then used to control their respective multiplexers 660 to select the proper delay value of the output of their respective register chain so that the delays of all of the lanes are equalized.

Figure 7:
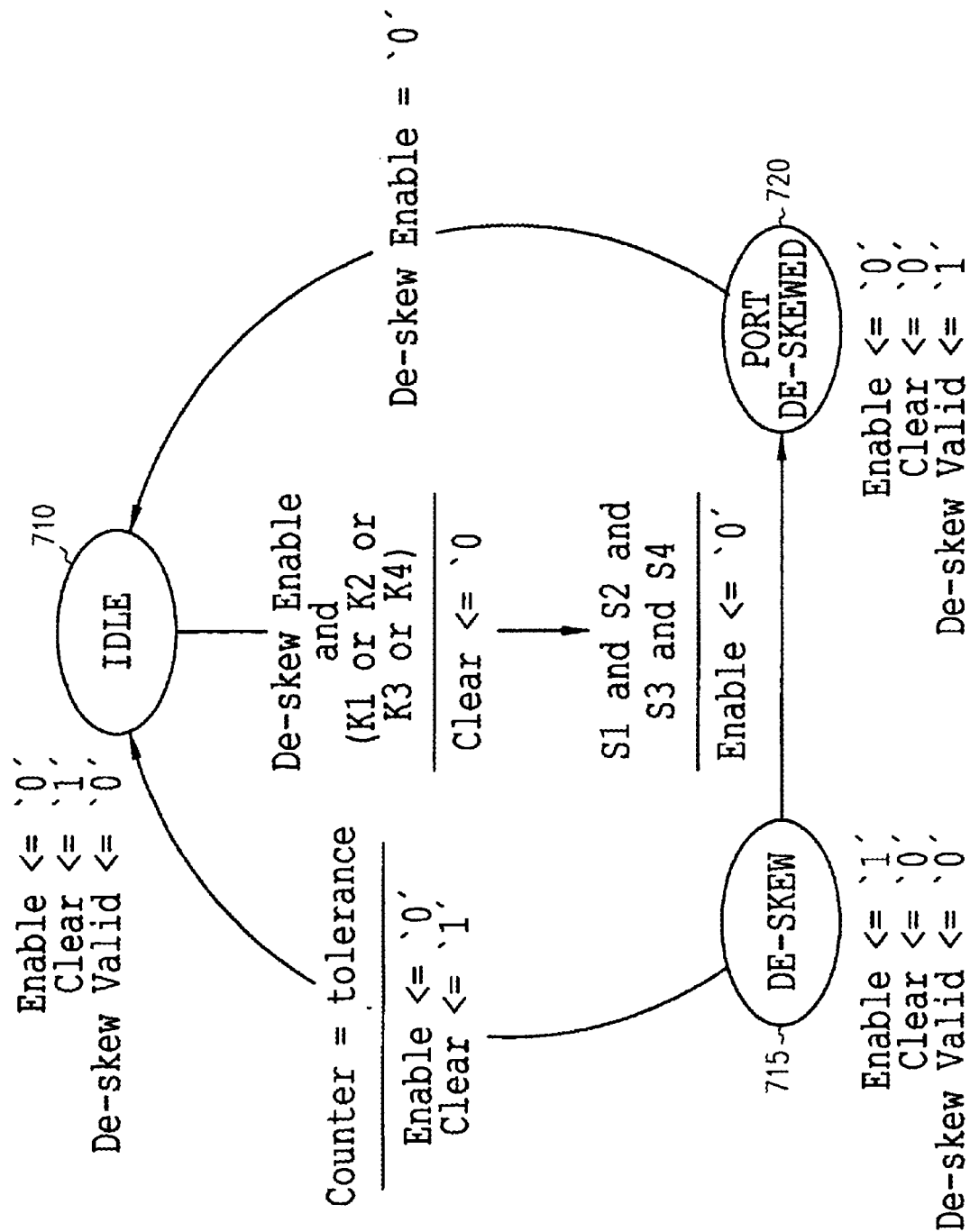
FIG. 7 is a state diagram of a multi-lane de-skewing control in accordance with the present invention.

Stated differently, the control state machine 610 awaits the assertion of the de-skew enable signal to begin the lane de-skew process. When the de-skew function is not enabled, the control state machine 610 asserts the clear output signal that clears the lane tolerance counters and selects the output of register-0 for all of the corresponding lane's data. Once enabled, the control state machine 610 asserts the enable signal state of the enable/disable line and de-activates the clear signal, thereby allowing the sticky flip-flops 640 to latch the presence of a comma character on their associated lane. When a comma character is detected on the respective lane, the Kx signal is asserted for a single clock cycle, thereby signaling that the comma character was received on the corresponding lane. A comma character detected on any lane causes the respective sticky flip-flop 640 to set until cleared. Once set, the respective lane's tolerance counter 650 is incremented each clock cycle while the corresponding data is latched into successive banks of data registers. The tolerance counter 650 of the lane that detected the initial comma character is used to define the period in which all comma characters must be received. The terminal value of this counter also defines the successive banks of registers required to perform de-skewing. As the tolerance increases, so does the tolerance counter's terminal values and the required banks of registers. If the comma characters are detected in all lanes within the specified period dictated by the tolerance, the enable/disable line is placed in the disable state, that is, is de-asserted, thereby latching the tolerance count value in each lane that is used to select the multiplexer output in order to align all of the lane's data in parallel to the receiver. The enable and clear outputs of the control state machine are connected to each lane's tolerance counters in parallel. Once de-skewed, the control state machine 610 refrains from further control of these signals unless deemed necessary by the respective receiver. The receiver can modify the state of the de-skew enable input signal to re-initiate the de-skew process. If any of the lane's tolerance counters expire prior to the reception of comma characters on all lanes, the lane de-skew has failed and the control state machine 610 will assert the clear signal in order to re-attempt to de-skew the respective link. FIG. 7 is a state diagram showing the required states and control signals necessary to perform the lane de-skewing in accordance with the present invention.

As shown in FIG. 7, the control state machine 610 initializes to the idle state 710 and waits to be configured to de-skew the link. The control state machine 610 is enabled to initiate lane de-skewing when the de-skew enable control signal is asserted. Once configured, the control state machine 610 awaits the arrival of a comma character on any of the corresponding lanes. The Kx (x=0 to the number of lanes −1) signals assert to indicate the arrival of a comma character on each respective lane and transition the control state machine 610 to the de-skew state 715. This transition disables the clear output, thereby allowing the respective sticky flip-flop 640 signal Sx to assert in the subsequent clock cycle. In the de-skew state, each lane that has received a comma character will enable its' respective tolerance counter 650 to begin tracking the defined tolerance period. If comma characters are received in all lanes prior to the expiration of the initial tolerance counter 650, then the de-skew is deemed valid and the control state machine 610 transitions into the port de-skewed state 720. In this state, each lane's tolerance count value is latched and then used to steer the multiplexer 660 responsible for data alignment accordingly. Otherwise, the control state machine 610 transitions into the idle state 710 to re-attempt to de-skew the respective link. At any time, the de-skew enable signal can be removed to re-initiate the de-skew process. This allows the receiver to have complete control over the de-skew function. The receiver can ultimately determine the validity of received packets and initiate a de-skew process if excessive flawed packets are received.

The de-skewing technique in accordance with the present invention significantly reduces the implementation requirements of a multi-lane receiver by removing the overhead of de-skewing the link from the receiver. A de-skewing arrangement in accordance with the present invention responds to a single control signal from the receiver block and provides a single status output indicating the current de-skew status, that is, valid or invalid. The lane circuitry can be replicated/configured to support any width link without modifications to the control state machine. The corresponding lane circuitry can be easily modified to support any specified tolerance simply by adding or removing the data buffering logic and the tolerance counter terminal value. The arrangement operates completely independently of the elastic buffer and places no additional requirements on its functionality. The pipelined architecture allows the circuit to have no latency impact on performance.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims, without departing from the spirit of the invention. In addition to variations and modifications in the component parts and/or arrangements, alternative uses will be apparent to those skilled in the art.

For example, while the present invention was developed for use in InfiniBand devices, the present invention is applicable to any multi-lane port interface design. Furthermore, as has been previously noted, the number of lanes and size of the register chain can be scaled to suit the particular application of the present invention and is not limited to the examples discussed above. Still furthermore, the choice of the comma character used as a reference in the de-skewing technique was merely for exemplary purposes and any character or symbol may be used.

What is claimed is:

1. A method of de-skewing a plurality of serial data signals respectively outputted from a plurality of data lanes, the method comprising:
   providing a de-skew signal for initiating a de-skewing process;
   simultaneously feeding a test signal to inputs of the plurality of data lanes and monitoring respective outputs thereof;
   respectively detecting a predetermined data element of the test signal outputted from each of the plurality of data lanes;
   measuring respective elapsed times from the detection of the predetermined data element outputted from each of the plurality of data lanes to the detection that the predetermined data element has been outputted from all of the plurality of data lanes; and
   de-skewing the plurality of serial data signals by respectively delaying them in accordance with their respective measured elapsed times;
   wherein, once de-skewed, further determination of elapsed times occurs only when another de-skew signal is received.

2. The method of claim 1, wherein the test signal comprises the predetermined data element, a lane identifier, and a predetermined number of additional data symbols, the predetermined data element comprising a predetermined data character.

3. The method of claim 1, wherein the elapsed times are measured by a plurality of lane tolerance counters, each counter initiating counting upon the detection of the predetermined data element in its data lane and each counter stopping counting upon the detection that the predetermined data element has been outputted from all of the plurality of data lanes.

4. The method of claim 1, wherein the plurality of serial data signals are respectively delayed by a plurality of registers.

5. The method of claim 3, wherein the plurality of serial data signals are respectively delayed by a plurality of registers.

6. The method of claim 5, wherein the amount of delay of each data signal is selected by a respective multiplexer connected to the plurality of registers, each multiplexer being controlled by its' respective counter.

7. A method of de-skewing a plurality of serial data signals respectively outputted from a plurality of data lanes, the method comprising:
   simultaneously feeding a test signal to inputs of the plurality of data lanes and monitoring respective outputs thereof;
   respectively detecting a predetermined data element of the test signal outputted from each of the plurality of data lanes;
   measuring respective elapsed times from the detection of the predetermined data element outputted from each of the plurality of data lanes to the detection that the predetermined data element has been outputted from all of the plurality of data lanes;
   de-skewing the plurality of serial data signals by respectively delaying them in accordance with their respective measured elapsed times; and
   detecting elapsed time from a first detection of the predetermined data element on any of the plurality of data lanes and declaring a de-skewing failure upon the detected elapsed time reaching a predetermined amount before the predetermined data element has been detected on all of the plurality of data lanes.

8. An apparatus for de-skewing a plurality of serial data signals respectively outputted from a plurality of data lanes, the apparatus comprising:
   a de-skew signal for initiating a de-skewing process;
   a test signal generator simultaneous feeding a test signal to inputs of the plurality of data lanes in response to the de-skew signal;
   a plurality of data element detectors respectively connected to outputs of the plurality of data lanes to respectively detect a predetermined data element of the test signal outputted from each of the plurality of data lanes;
   a control state machine connected to the plurality of data element detectors to detect that the predetermined data element of the test signal outputted from each of the plurality of data lanes has been detected by all of the data element detectors;
   a plurality of elapsed time detectors to detect respective elapsed times from the detection by the data element detectors of the predetermined data element outputted from each of the plurality of data lanes to the detection by the control state machine that the predetermined data element has been outputted from all of the plurality of data lanes; and
   a plurality of time delay units respectively connected to the plurality of elapsed time detectors to respectively delay the plurality of serial data signals in accordance with the detected elapsed times of their respective elapsed time detectors;
   wherein, once de-skewed, the control state machine refrains from further control of the serial data signals until another de-skew signal is received.

9. The apparatus of claim 8, wherein the test signal comprises the predetermined data element, a lane identifier, and a predetermined number of additional data symbols, the predetermined data element comprising a predetermined data character.

10. The apparatus of claim 8, wherein the plurality of elapsed time detectors respectively comprise a plurality of lane tolerance counters, each counter initiating counting upon the detection of the predetermined data element in its data lane by its respective data element detector and each counter stopping counting upon the detection that the predetermined data element has been outputted from all of the plurality of data lanes as detected by the control state machine.

11. The apparatus of claim 8, wherein the plurality of time delay units respectively comprise a plurality of registers.

12. The apparatus of claim 10, wherein the plurality of time delay units respectively comprise a plurality of registers.

13. The apparatus of claim 12, further comprising a plurality of multiplexers respectively connected to the plurality of registers and plurality of counters, each multiplexer selectively determining the amount of delay of its respective data signal in accordance with an output from its' respective counter.

14. An apparatus for de-skewing a plurality of serial data signals respectively outputted from a plurality of data lanes, the apparatus comprising:
   a test signal generator simultaneous feeding a test signal to inputs of the plurality of data lanes;
   a plurality of data element detectors respectively connected to outputs of the plurality of data lanes to respectively detect a predetermined data element of the test signal outputted from each of the plurality of data lanes;
   a control state machine connected to the plurality of data element detectors to detect that the predetermined data element of the test signal outputted from each of the plurality of data lanes has been detected by all of the data element detectors;
   a plurality of elapsed time detectors to detect respective elapsed times from the detection by the data element detectors of the predetermined data element outputted from each of the plurality of data lanes to the detection by the control state machine that the predetermined data element has been outputted from all of the plurality of data lanes;
   a plurality of time delay units respectively connected to the plurality of elapsed time detectors to respectively delay the plurality of serial data signals in accordance with the detected elapsed times of their respective elapsed time detectors; and
   wherein the control state machine monitors elapsed time from a first detection of the predetermined data element on any of the plurality of data lanes by one of the plurality of elapsed time detectors and declares a de-skewing failure upon the monitored elapsed time reaching a predetermined amount before the predetermined data element has been detected on all of the plurality of data lanes by the plurality of data element detectors.

15. The apparatus of claim 10, further comprising a plurality of sticky flip-flops respectively disposed between said plurality of data element detectors and their respective counters.

16. A program storage device, readable by machine and tangibly embodying a program of instructions executable by the machine to perform a method of de-skewing a plurality of serial data signals respectively outputted from a plurality of data lanes, the method comprising:
   providing a de-skew signal for initiating a de-skewing process;
   simultaneously feeding a test signal to inputs of the plurality of data lanes and monitoring respective outputs thereof;
   respectively detecting a predetermined data element of the test signal outputted from each of the plurality of data lanes;
   measuring respective elapsed times from the detection of the predetermined data element outputted from each of the plurality of data lanes to the detection that the predetermined data element has been outputted from all of the plurality of data lanes; and
   de-skewing the plurality of serial data signals by respectively delaying them in accordance with their respective measured elapsed times;
   wherein, once de-skewed, further determination of elapsed times occurs only when another de-skew signal is received.

17. The device of claim 16, wherein the test signal comprises the predetermined data element, a lane identifier, and a predetermined number of additional data symbols, the predetermined data element comprising a predetermined data character.

18. The device of claim 16, wherein the elapsed times are measured by a plurality of lane tolerance counters, each counter initiating counting upon the detection of the predetermined data element multiplexer selects lane and each counter stopping counting upon the detection that the predetermined data element has been outputted from all of the plurality of data lanes.

19. The device of claim 16, wherein the plurality of serial data signals are respectively delayed by a plurality of registers.

20. The device of claim 18, wherein the plurality of serial data signals are respectively delayed by a plurality of registers.

21. The device of claim 20, wherein the amount of delay of each data signal is selected by a respective multiplexer connected to the plurality of registers, each multiplexer being controlled by its' respective counter.

22. A program storage device, readable by machine and tangibly embodying a program of instructions executable by the machine to perform a method of de-skewing a plurality of serial data signals respectively outputted from a plurality of data lanes, the method comprising:
   simultaneously feeding a test signal to inputs of the plurality of data lanes and monitoring respective outputs thereof;
   respectively detecting a predetermined data element of the test signal outputted from each of the plurality of data lanes;
   measuring respective elapsed times from the detection of the predetermined data element outputted from each of the plurality of data lanes to the detection that the predetermined data element has been outputted from all of the plurality of data lanes;
   de-skewing the plurality of serial data signals by respectively delaying them in accordance with their respective measured elapsed times; and
   detecting elapsed time from a first detection of the predetermined data element on any of the plurality of data lanes and declaring a de-skewing failure upon the detected elapsed time reaching a predetermined amount before the predetermined data element has been detected on all of the plurality of data lanes.

* * * * *